United States Patent
Moore et al.

(10) Patent No.: US 12,357,013 B2
(45) Date of Patent: Jul. 15, 2025

(54) FOOD OR WARE WASHING, DEGLAZING AND DEFROSTING SYSTEM AND METHODS OF DEGLAZING AND DEFROSTING FOOD ITEMS

(71) Applicant: Electrolux Professional, Inc., Vicksburg, MS (US)

(72) Inventors: Roger Moore, Brandon, MS (US); Calvin M. Sims, Brandon, MS (US)

(73) Assignee: ELECTROLUX PROFESSIONAL, INC., Vicksburg, MS (US)

( * ) Notice: Subject to any disclaimer, the term of this patent is extended or adjusted under 35 U.S.C. 154(b) by 1218 days.

(21) Appl. No.: 15/334,778

(22) Filed: Oct. 26, 2016

(65) Prior Publication Data

US 2017/0224003 A1  Aug. 10, 2017

Related U.S. Application Data

(60) Provisional application No. 62/246,491, filed on Oct. 26, 2015, provisional application No. 62/375,230, (Continued)

(51) Int. Cl.
*A23N 12/02* (2006.01)
*A23B 2/82* (2025.01)
(Continued)

(52) U.S. Cl.
CPC ............ *A23N 12/02* (2013.01); *A23B 2/82* (2025.01); *A23B 4/07* (2013.01); *A47L 15/0002* (2013.01);
(Continued)

(58) Field of Classification Search
CPC ........... A23N 12/02; A23B 4/07; A23L 3/365; B08B 3/048; B08B 3/10; B08B 3/102
See application file for complete search history.

(56) References Cited

U.S. PATENT DOCUMENTS 7,578,305 B2   8/2009  Bigott
2007/0277855 A1*  12/2007  DiPanni ................ A23N 12/02
                                                                      134/25.3
(Continued)

FOREIGN PATENT DOCUMENTS

KR    100502167 B1   8/2005
WO    2011011763 A1  1/2011

OTHER PUBLICATIONS

"Diffuser" Definition retrieved from Oxford English Dictionary on Aug. 7, 2021 https://www.oed.com/view/Entry/52537?redirectedFrom=diffuser#eid (Year: 2021).*
"Diffuser" Definition retrieved from Definitions.net on Aug. 7, 2021 https://www.definitions.net/definition/diffuser (Year: 2021).*
Sani-Matic, Inc.; Website: http://sanimatic.com/food-beverage/clean-out-of-place/; last accessed on Apr. 14, 2017.
International Search Report and Written Opinion for PCT/US2016/058846, mailed Feb. 3, 2017.

*Primary Examiner* — Katherine D Leblanc
(74) *Attorney, Agent, or Firm* — Kutak Rock LLP

(57) ABSTRACT

A system and method for deglazing or defrosting items, for cleaning wares, and/or for thermalizing/rethermalizing food items. The system includes a tank for holding fluid and a wash pump for creating a rolling washing action within the wash tank. The method includes placing items into the fluid so that as the fluid rolls within the wash tank, the items become deglazed or defrosted. The system further includes a discharge manifold with a plurality of discharge jets, a flow balancer for equalizing flow to multiple sections of the tank, and a diffuser plate for equalizing flow within a section of the tank. The various components of the system can be removed for cleaning, inspection, and/or replacement. The discharge manifold is accessible for removal and is configured to be easily cleaned.

10 Claims, 10 Drawing Sheets

Related U.S. Application Data filed on Aug. 15, 2016, provisional application No. 62/379,644, filed on Aug. 25, 2016.

(51) Int. Cl.
    *A23B 4/07*         (2006.01)
    *A47L 15/00*      (2006.01)
    *B08B 3/04*        (2006.01)
    *B08B 3/10*        (2006.01)

(52) U.S. Cl.
    CPC ............... *B08B 3/048* (2013.01); *B08B 3/10* (2013.01); *B08B 3/102* (2013.01); *B08B 2203/007* (2013.01)

(56) References Cited

U.S. PATENT DOCUMENTS

| | | | |
|---|---|---|---|
| 2012/0291496 A1* | 11/2012 | Suel | ........................ D06F 17/06 68/134 |
| 2012/0305034 A1 | 12/2012 | Cantrell et al. | |
| 2015/0007588 A1 | 1/2015 | Cantrell et al. | |

\* cited by examiner

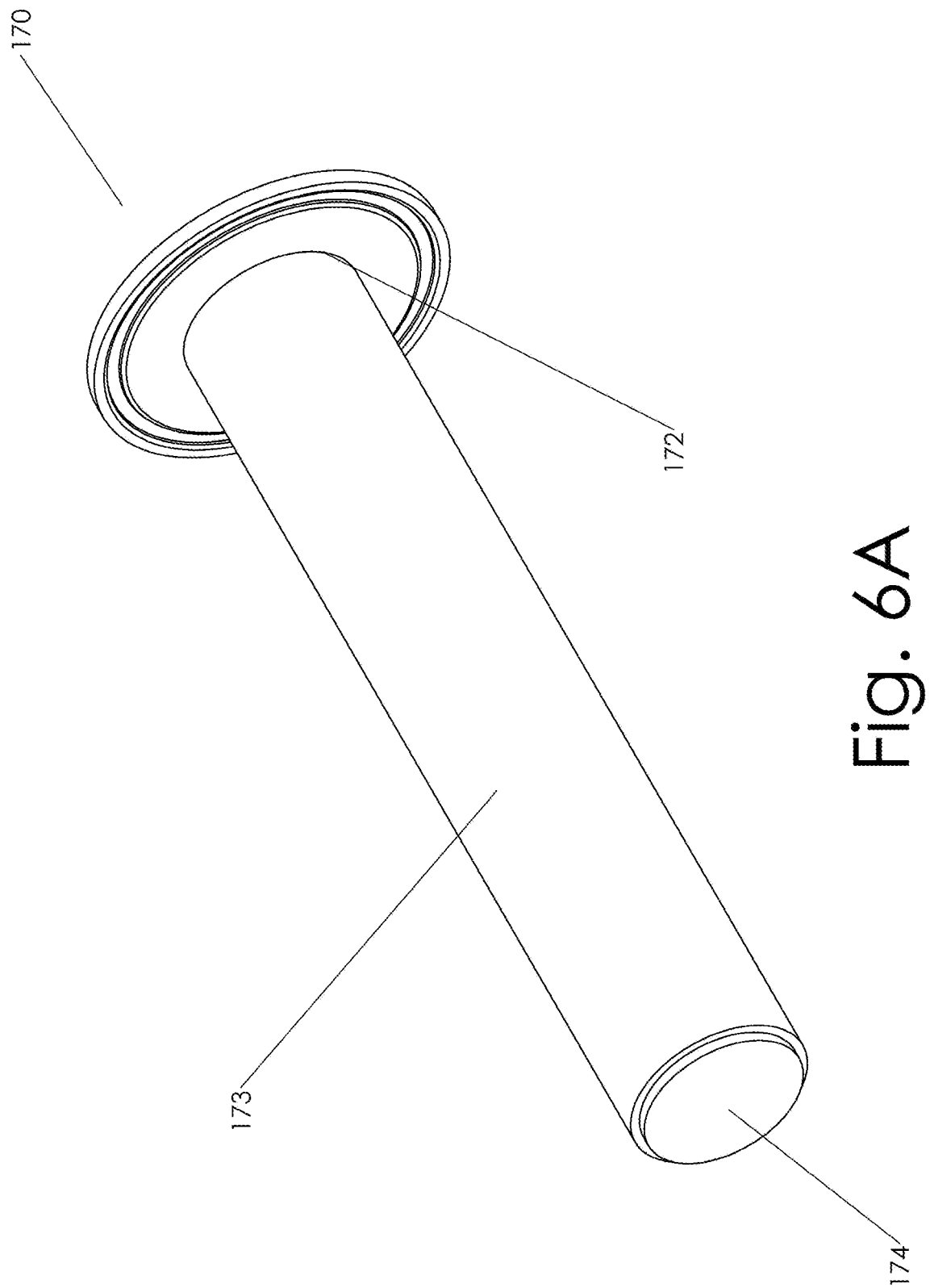

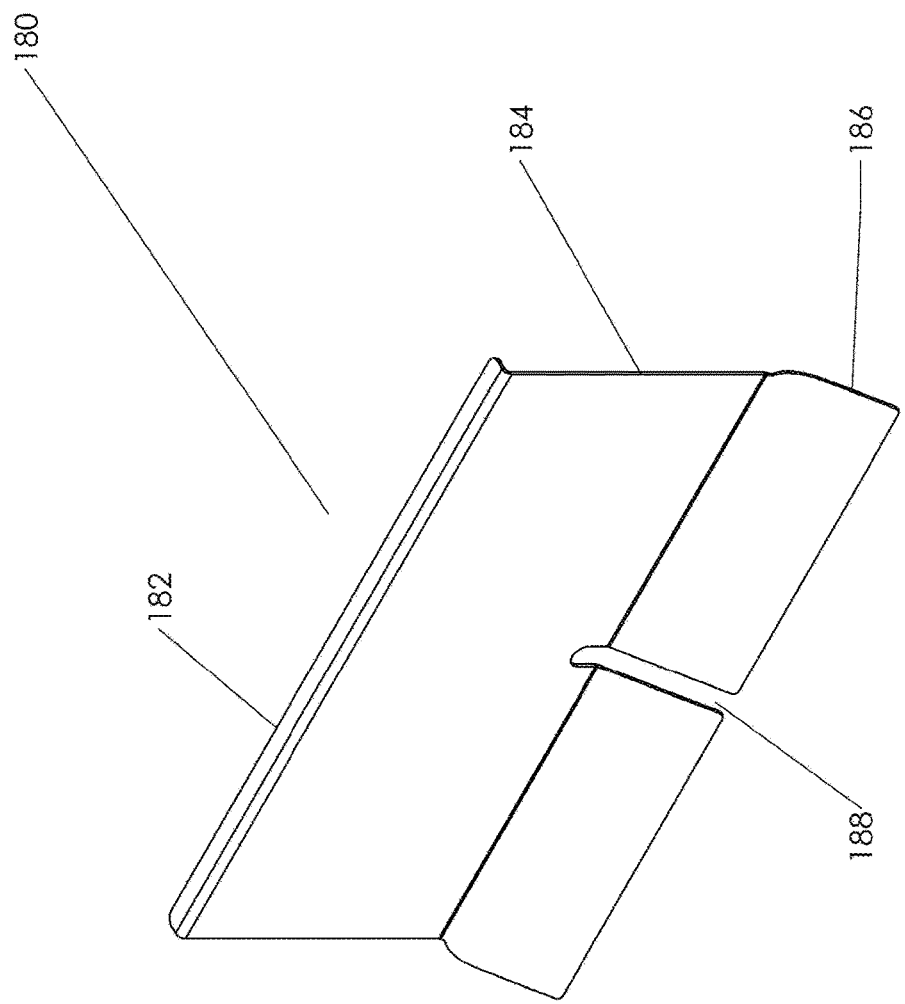

FOOD OR WARE WASHING, DEGLAZING AND DEFROSTING SYSTEM AND METHODS OF DEGLAZING AND DEFROSTING FOOD ITEMS

CROSS-REFERENCE TO RELATED APPLICATIONS

This application claims priority pursuant to 35 U.S.C. 119(e) to co-pending U.S. Provisional Patent Application Ser. Nos. 62/246,491, 62/375,230, and 62/379,644 filed Oct. 26, 2015, Aug. 15, 2016, and Aug. 25, 2016, respectively, the entire disclosures of which are incorporated herein by reference.

FIELD OF THE INVENTION

The present invention relates to a food or ware washing, food thermalization/rethermalization, deglazing and/or defrosting system, components of a food or ware washing, deglazing and/or defrosting system, and methods of deglazing and/or defrosting food products. More particularly, some embodiments of the present invention relate to a system for and method of submerging food items within a body of flowing fluid so as to deglaze and/or thaw the food items.

BACKGROUND

Many frozen or chilled items, such as shrimp, acquire ice crystals and other debris that is not always readily removable from the items. In some instances, the items are placed in large volumes of fluid, such as water, until the ice melts away and/or the debris dissolves or otherwise becomes separated from the items ("deglazing"). Because the items often must be maintained at relatively low temperatures during the deglazing process, cold fluids are often required, thereby requiring long periods of time for the ice to fully melt and/or the other debris to sufficiently dissolve. Consequently, it would be beneficial to have a system for, and a method of, quickly and effectively deglazing items.

Defrosting items, which requires the introduction of heat to the item, also often requires the items to be maintained at a relatively low temperature. Traditionally, the heat is introduced slowly through thermal conduction with the frozen items being placed in low-temperature environment. In this way, the temperature of the outer surface of the item is maintained at a relatively low temperature as the heat energy slowly migrates towards the center of the frozen item, thereby thawing the item. Unfortunately, because this process is so time consuming, the outer layers of the items sometimes begin to spoil and/or are otherwise adversely affected before the inner layers of the items are thawed. More recently, microwave radiation heating has been used to simultaneously introduce heat energy to the entire cross section of frozen items. Unfortunately, this process often results in portions of the items becoming too warm, sometimes even partially cooking those portions of the items. Other times, portions of the item never quite thaw properly. Consequently, it would be beneficial to have a system for, and process of, thawing and/or rethermalizing food items that is quicker than conduction heating and that is more reliable than radiation heating.

U.S. patent application Ser. No. 14/325,148, the entire disclosure of which is incorporated herein by reference, discloses systems for, and methods of, utilizing continuous motion fluid machines (such as those traditionally used for ware washing) to defrost food items.

Continuous motion fluid machines often involve a large tank or basin in which fluid is circulated to provide a rolling action. One such machine is described in U.S. Pat. No. 4,773,436 issued to Cantrell et al., the entire disclosure of which is incorporated herein by reference. The machine of Cantrell includes a tank with multiple jets evenly spaced apart at an elevated position along the rear wall of the tank. The tank is filled with water (or wash fluid) to a level above the position of the jets. Pots and pans (or other items) are placed in the tank, and a pump is activated to draw fluid from within the tank and direct it through the jets to create a jet stream. Each jet directs its jet stream toward the bottom wall of the tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provides a rolling action within the tank.

With reference to a ware washing embodiment, the basic components of the wash tank of an exemplary pot and pan washing machine of the prior art are shown in FIG. 1. Wash tank 10 includes end walls 12 and 14, rear side wall 16, front side wall 18 and bottom wall 19. A pump can be attached to either end wall; in the embodiment shown in FIG. 1, pump 50 is attached to right end wall 14. An impeller located within pump 50 is driven by electric motor 56. In the embodiment shown in FIG. 1, the impeller draws fluid into pump inlet 52 through an intake port (not shown) located in end wall 14. The fluid is then discharged from the pump through pump outlet 54 and into outlet manifold 60. Outlet manifold 60 includes a ninety degree turn, and several other turns, to direct the fluid across the back side of rear wall 16 and out jet nozzles 20 which are protruding through and extending from rear wall 16. The intake port associated with pump inlet 52 is covered by perforated (holes, voids, mesh, etc.) intake manifold 30. Intake manifold 30 includes handle 36 and is removably supported within wash tank 10 for easy cleaning. Intake manifold 30 fits tightly between outer runner 32 and inner runner 34, each of which extends vertically from bottom wall 19. Heating element 40 is positioned between intake manifold 30 and end wall 14 for its protection and to maximize the use of space.

Although the prior art pot and pan washing machine disclosed in U.S. Pat. No. 4,773,436 provides an exceptional circulating action, many of the components discussed above hinder the overall efficiency and performance of the machine. The inventions disclosed in U.S. application Ser. Nos. 09/947,484, 09/947,485, and 10/744,666, the entire disclosures of which are incorporated herein by reference, provide components that greatly increase the overall efficiency and performance of the machine, including improvements to the intake and discharge manifolds, jets, pump and system assembly methods. Additionally, the invention disclosed in U.S. application Ser. No. 12/842,984, the entire disclosure of which is incorporated herein by reference, provides components and methods for washing produce (and other items). Furthermore, U.S. application Ser. Nos. 12/020,223, 12/697,534, 12/765,838, 12/781,750, 13/021,682, 13/080,453, 13/332,360, 13/367,179, 14/276,537, 14/379,190, the entire disclosures of which are incorporated herein by reference, provide additional improvements for the operation of continuous motion style fluid circulating/washing machines. Furthermore still, the inventions disclosed in U.S. Application Ser. Nos. 62/011,483 and 62/174,330, the entire disclosures of which are incorporated herein by reference, provide components and methods for cleaning various areas of the machine. Nevertheless, prior to the advent of the instant invention, the ability to utilize the fluid circulating style machine with certain items was limited. For instance, some items, such as shrimp, are too delicate for machines of the prior art and/or machines of the prior art do not provide adequate means for maintaining sanitation requirements for the items and/or are otherwise inadequate for use with the items. Thus, it would be beneficial to provide a device for food or ware washing, food thermalization/rethermalization, item deglazing and/or defrosting, and/or a method of, deglazing and/or defrosting a variety of items while maintaining sanitation and other requirements for the items. It would further be beneficial to provide a means of balancing fluid flow to a plurality of tank sections and/or diffusing fluid flow within one or more tank section.

SUMMARY

The instant invention provides a system for food or ware washing, food thermalization/rethermalization, and deglazing and/or defrosting, and method of deglazing and/or defrosting food products utilizing continuous fluid flow within a continuous motion wash tank style machine. Although the present invention differs from the systems of the prior art, some embodiments of the present invention include one or more feature of the pot and pan washing machines described in any of U.S. Pat. No. 4,773,436, or U.S. application Ser. Nos. 09/947,484, 09/947,485, 10/744,666, 12/430,724, 12/765,838, 12/842,984 (the entire disclosures of which are incorporated herein by reference). It will be appreciated that other embodiments of the present invention are utilized with other washing machines, or with various combinations of washing machine components, without departing from the spirit and scope of the instant invention.

The machine of the instant invention includes a pump for directing fluid through a plurality of discharge jets into a tank of a continuous motion fluid machine while simultaneously drawing fluid from the tank, thereby creating a rolling action within the tank. In a preferred embodiment, the machine includes a heating or cooling element for maintaining and/or otherwise controlling the temperature of the fluid. In another preferred embodiment, the machine includes one or more partitioning walls to subdivide a section of the tank.

In one preferred embodiment, the partitioning walls are removably supported within voids created between two adjacent flow guide structures within the tank as is further described in U.S. application Ser. No. 12/765,838, filed on Apr. 22, 2010, the entire disclosure of which is incorporated herein by reference. In another embodiment, each partitioning wall is held in position within the tank via a pair of removable support brackets that include rails or a slot in which the partition is retained. In yet other embodiments, each portioning wall is held in position by non-removable supports, such as rails or channels welded to the walls of the tank.

In a preferred embodiment of the present invention, the plurality of discharge jets each extend from a discharge manifold into the tank. In some such embodiments, the discharge manifold is positioned outside of the tank such that the discharge jets must extend through one or more aperture defined by a wall of the tank. In some embodiments, one aperture is configured to receive a plurality of discharge jets. In other embodiments, each aperture is configured to receive just one discharge jet. Each aperture is configured to seal around the discharge jets so as to enable the discharge jets to be fully submerged by circulating fluid within the tank during operation.

Certain portions of the discharge manifold are selectively removable (and/or capable of disassembly) from the tank so as to enable a user to clean, inspect, and sanitize the manifold and/or to allow a user to readily replace the manifold components. In some embodiments, the discharge manifold is located on a front surface of the tank and/or is otherwise positioned so as to be readily accessible for disassembly and/or cleaning. In some embodiments, the discharge manifold is relatively cylindrical in shape and/or includes relatively large radii at each corner so as to more readily facilitate cleaning the discharge manifold with brushes or other cleaning devices; so as to more readily facilitate connecting and/or disconnecting the discharge manifold to piping; and/or so as to reduce or eliminate the likelihood that an internal corner will retain debris and/or that an external corner will cause harm to a user.

In some embodiments, the discharge manifold is configured to selectively receive one or more flow altering orifices. In some such embodiments the flow altering orifices are removable and reinsertable washers or rings that have an inner diameter that is smaller than the inner diameter of the manifold, so as to restrict the flow of fluid through the manifold when in position. This allows the flow through the system to be adjusted to a desired maximum.

In some embodiment, the system includes a flow selector for selectively increasing or decreasing flow into the discharge manifold, thereby increasing or decreasing the rolling fluid action created in the tank. In this way, a user can selectively decrease the flow when a more aggressive flow is not necessary and/or would be detrimental, such as while deglazing shrimp, and can increase the flow when a more aggressive flow is favorable and/or necessary, such as for washing pots and pans. In some embodiments, the flow is increased briefly so as to load items into a basket positioned at or near a top surface of the fluid. Such methodology of use is particular beneficial for use with more fragile items. For example, when deglazing crab, the legs are subject to dismemberment if subjected to more aggressive flow. Using a decreased flow will allow fluid to flow around the crab without cause the crab to circulate with the fluid (e.g. the crab remains in a static location within the tank). When it is desired to unload the crab, however, the flow is increased after the unload basket (similar to that shown in U.S. application Ser. No. 12/842,984) is placed in position. The increased flow causes the crab to circulate with the fluid up into the unload basket for easy removal from the tank.

In some embodiments, the flow selector includes a handle for moving the selector from a first position to a second position and/or to a plurality of other positions. In some such embodiments, the handle includes one or more feature for providing visual and/or haptic feedback so as to indicate to the user that the flow selector is in one of the plurality of positions. In other embodiments, the flow selector includes a latch that is moveable between a locked configuration and an unlocked configuration. In the locked configuration, the latch prevents the flow selector from moving from its current position. In the unlocked configuration, the latch allows the flow selector to move between positions.

In some embodiments, the flow selector is removable from the system so as to enable a user to readily clean, inspect, and/or sanitize the flow selector and/or replace the flow selector. In other embodiments, all piping between the pump and the tank is removable from the system so as to enable a user to readily clean, inspect, and/or sanitize the piping. In still other embodiments, the pump is removable from the system and/or capable of being fully disassembled so as to enable a user to readily clean, inspect, and/or sanitize the pump. In yet other embodiments, the tank includes one or more additional feature for assisting a user in cleaning, inspecting, and/or sanitizing the tank after use and/or between uses.

In some embodiments, the system includes one or more sensor for determining various properties of the fluid. In some embodiments, the system includes one or more fluid level sensor for determining whether there is enough fluid in the tank for proper operation and/or for determining whether the current flow of the fluid within the tank is sufficient to cause items in the tank to be loaded into a basket and/or onto a scoop for unloading the wash tank. In some embodiments the fluid level sensor acts as a safety mechanism. In such embodiments, when a portion of the manifold and/or pump is disassembled, the system is designed such that the tank will not hold fluid (e.g. the fluid will drain out of the disassembled pipe, etc.). As a result, the fluid level system will prevent the pump from operating. Thus preventing accidental injury cause by exposed moving parts. In other embodiments, the system includes one or more temperature sensor for determining whether the temperature of the fluid is within a predetermined acceptable range and/or a desired range. In some such embodiments, the system includes one or more heating element and/or one or more cooling system for selectively increasing or decreasing the temperature of the fluid.

In some embodiments, the system is designed to eliminate or otherwise reduce turbulence in the fluid as the fluid flows from the pump to the discharge jets. In some such embodiments, the cross section of the tubing, flow selector, and/or discharge manifold are configured such that flow through and between such components is generally laminar.

In preferred embodiments, the manifold includes opposed proximal and distal ends and a main body extending therebetween. The proximal end of the manifold is in fluid communication with a pump and is configured to allow fluid to flow from the pump into an interior area defined by the main body of the manifold. A plurality of discharge jets extend from the main body into a wash tank, each discharge jet being configured to allow the fluid to flow out of the interior area and into the wash tank.

In some embodiments, the manifold further includes a flow balancer for equalizing flow to one or more sections of a wash tank. In some such embodiments, the flow balancer causes the system to increase flow through one or more discharge jet while decreasing flow through one or more other discharge jet, thereby directing fluid more evenly through each of the discharge jets. In some such embodiments, the flow balancer includes a proximal end coupled to the distal end of the manifold, a distal end that is positioned inside of the interior area of the manifold, and a main body that extends therebetween. In some such embodiments, the flow balancer extends from the distal end of the manifold past one or more discharge jet but not past each of the discharge jets.

Some embodiments of the present invention include a diffuser plate. In some embodiments, the diffuser plate extends at least partially over one or more discharge jet such that fluid being discharged from the discharge jets (the "jet stream") hits the diffuser plate, thereby flattening and/or otherwise diffusing the fluid flow into the tank. In this way, the amount of fluid being forced into a section of a wash tank can remain constant while reducing damage associated with the high velocity of fluid flowing from the discharge jets.

In a preferred embodiment, the system is capable of deglazing and/or defrosting items while maintaining the items at a relatively low temperature. It will be appreciated that, in other embodiments, the system is capable of heating items to a relatively high temperature. For instance, in some embodiments, the system includes a closed lid (which in some embodiments includes an interlock) and the temperature of the fluid is raised to be at or near the fluid's boiling temperature (or to some other predetermined temperature in which food thermalization and/or rethermalization can be accomplished). In some such embodiments, the fluid is capable of cooking items, such as pasta, or otherwise heating/reheating items to a relatively high temperature. In other embodiments, the fluid is raised to an elevated temperature that is not necessarily at or near the boiling temperature of the fluid. In some such embodiments, the system is still capable of heating items, including packaged food items. It will be still further appreciated that, in still other embodiments, the system is configured as a chiller for drawing heat out of objects and/or for maintaining food at a relatively low temperature.

The instant invention provides a versatile continuous motion fluid system that is suitable for a variety of applications, including, but not necessarily limited to: pot/pan/ware washing; food and produce washing; food thermalization/rethermalization; deglazing and/or defrosting. A single machine can easily be used in all types of applications with only slight adjustments or minor modifications. In the embodiments with the intake and discharge manifolds located along the front of the machine, all surfaces are capable of being visually inspected and disassembled for clean out of place (COP) cleaning, allowing the machine to be used in food preparation and/or food production applications. In embodiments with the flow selector, the same machine that is used to wash (thermalize, etc.) delicate items at a lower fluid flow rate, can be used to wash less delicate items (e.g. pots and pans) at a high fluid flow rate. The inclusion of heaters and/or chillers help in cleaning as well as various food preparation or food production applications.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings.

FIG. 6A is a perspective view of a flow balancer of the present invention.

FIG. 7A is a perspective view of a diffuser plate of the present invention.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
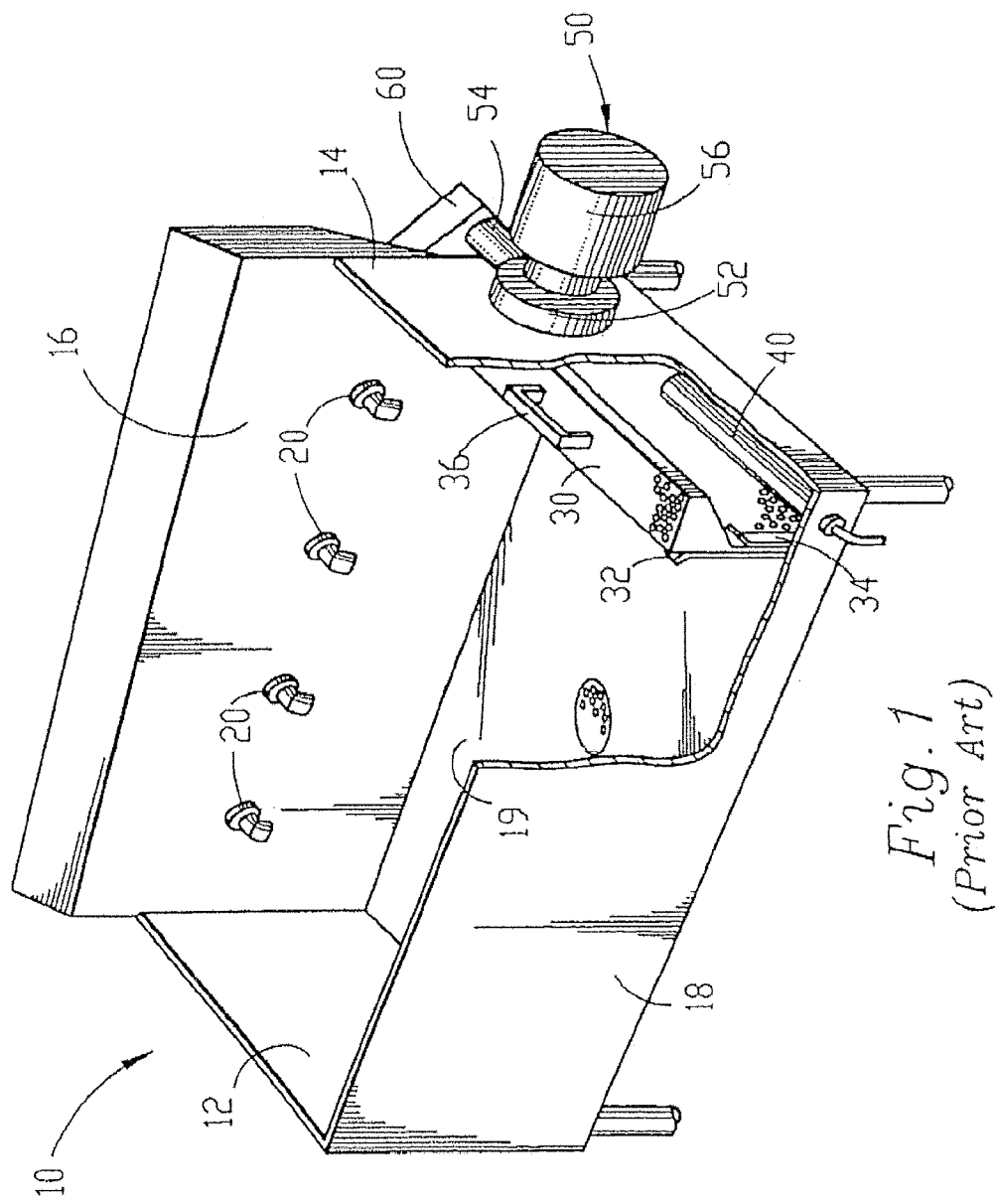
FIG. 1 is a partial perspective view of a continuous motion washing machine of the prior art, components of which embodiments of the instant invention may incorporate.
Figure 2:
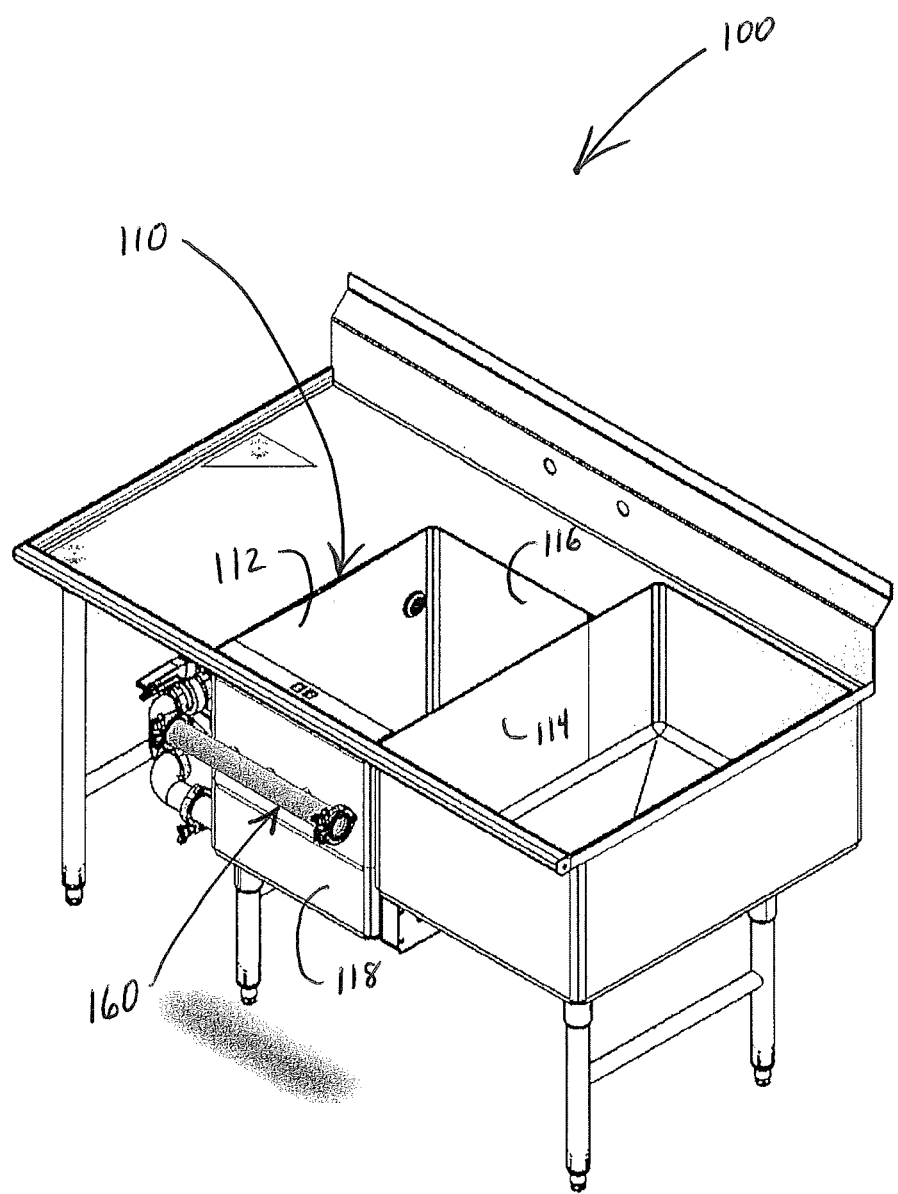
FIG. 2 is front perspective view of an embodiment of the present invention having a horizontal discharge manifold positioned on a front wall of a wash tank.

Referring to FIG. 2, a preferred embodiment of a deglazing system 100 of the present invention includes a wash tank 110 having opposed left 112 and right 114 end walls extending between opposed rear 116 and front 118 side walls. The wash tank 110 further includes a bottom wall 119 extending from a bottom edge of each of the left 112, right 114, rear 116, and front 118 walls so as to define an interior area 115 for holding a volume of fluid. In some embodiments, a discharge manifold 160 is coupled to one or more wall of the wash tank 110. In some such embodiments, the discharge manifold 160 is secured to a front surface of the front wall 118 and one or more discharge jet 166 of the discharge manifold 160 extends through the front wall 118 into the interior area 115 of the wash tank 110.

Figure 3:
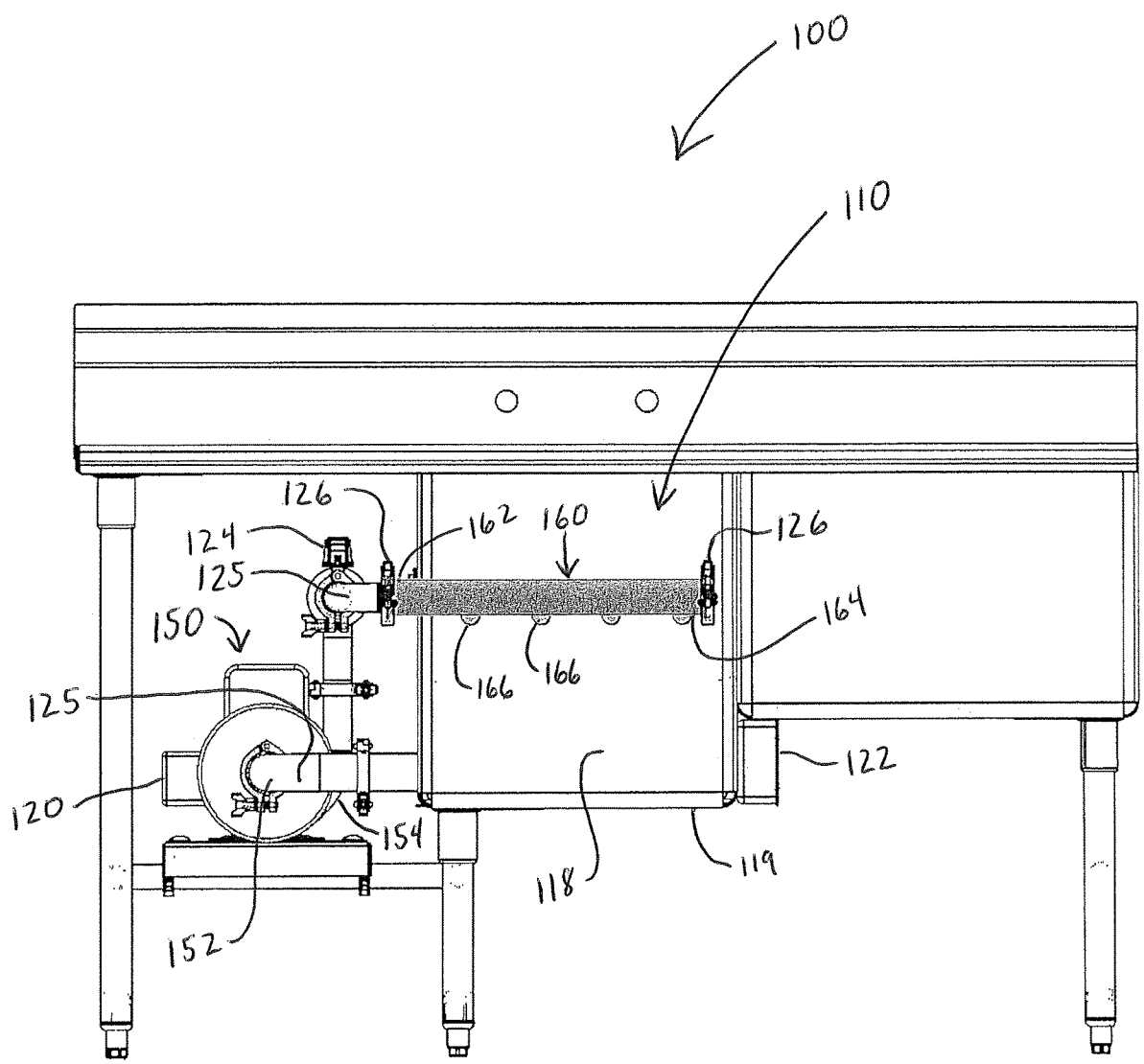
FIG. 3 is a front elevation view of the embodiment of FIG. 2.

Referring to FIG. 3, the discharge manifold 160 is in fluid communication with a pump outlet 154 of a pump 150. Fluid is withdrawn from the wash tank 110 by the pump 150 and is discharged by the pump 150 back into the wash tank 110 through one or more discharge jet 166 of the discharge manifold 160, thereby creating a circulating action within the wash tank. In some embodiments, the fluid is drawn from the wash tank 110 to a pump inlet 152 of the pump 150 through one or more pipe 125. In other embodiments, the fluid is driven to the discharge manifold 160 through one or more pipe 125. In still other embodiments, the fluid is driven and/or drawn through a flow selector 124 so as to control the amount of flow from and/or to the wash tank 110. In yet other embodiments, one or more pipe 125 is secured to the wash tank 110, the pump inlet 152, the pump outlet 154, the discharge manifold 160, a flow selector 124, and/or another pipe 125 by way of a removable pipe clamp 126 such that the pipe 125 is removable for cleaning.

In some embodiments, the system further includes one or more sensor for determining various properties of the fluid. For instance, some embodiments include one or more temperature sensor 120 for determining whether the temperature of the fluid is within a predetermined acceptable range and/or a desired range. In some such embodiments, the system includes one or more heating element (not shown), one or more heater controller 122, and/or one or more cooling system (not shown) for selectively increasing or decreasing the temperature of the fluid.

Referring to FIG. 2, some embodiments include a horizontal discharge manifold 160. A horizontal discharge manifold 160 includes a plurality of spaced-apart discharge jets 166 positioned generally along a horizontal line of a horizontal plain, each discharge jet being oriented in generally the same downward angle from the horizontal plain such that each discharge jet 166 is configured to direct fluid into the wash tank 110 at a downward angle, thereby creating a circular wash action about a generally horizontal axis.

Figure 4:
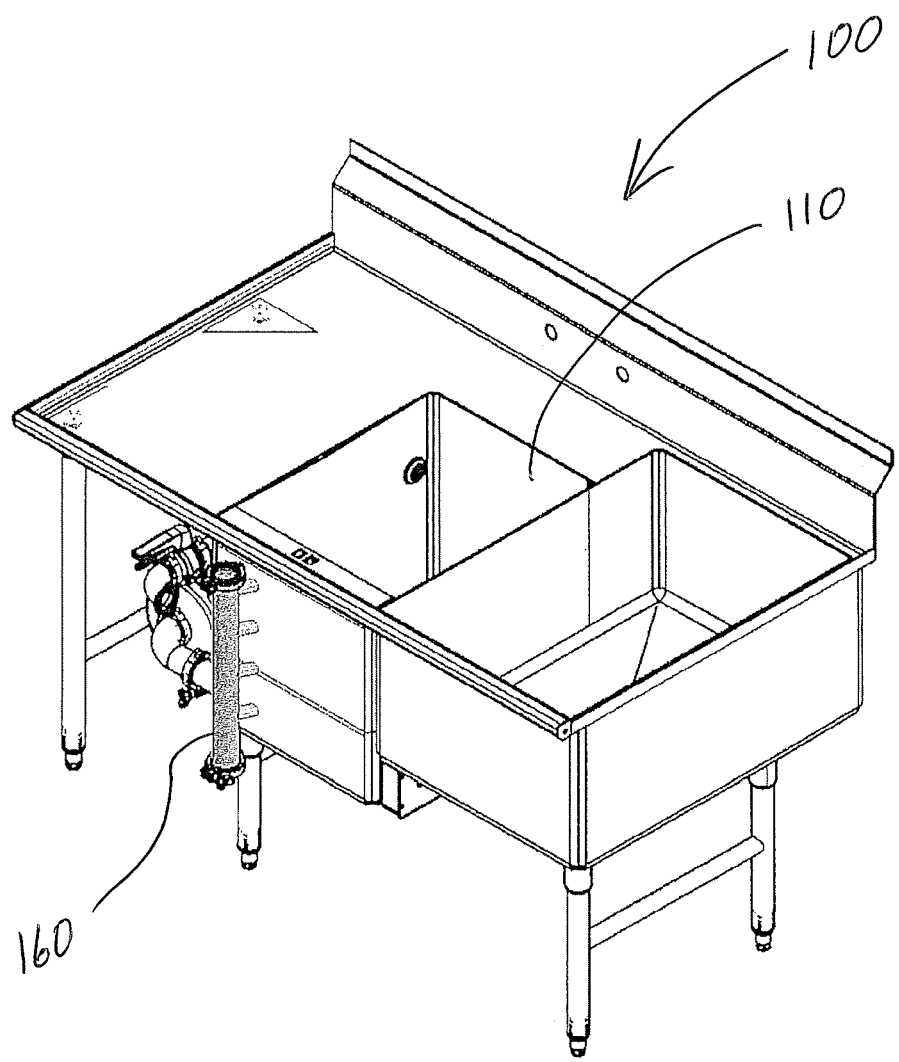
FIG. 4 is a front perspective view of an embodiment of the present invention having a vertical discharge manifold positioned on a front wall of a wash tank.

Referring to FIG. 4, some embodiments include a vertical discharge manifold 160. A vertical discharge manifold 160 includes a plurality of spaced-apart discharge jets 166 positioned generally along a vertical line of a vertical plain, each discharge jet being oriented in generally the same angle such that each discharge jet 166 is configured to direct fluid into the wash tank 110 in generally the same direction, thereby creating a circular wash action about a generally vertical axis.

Figure 5A:
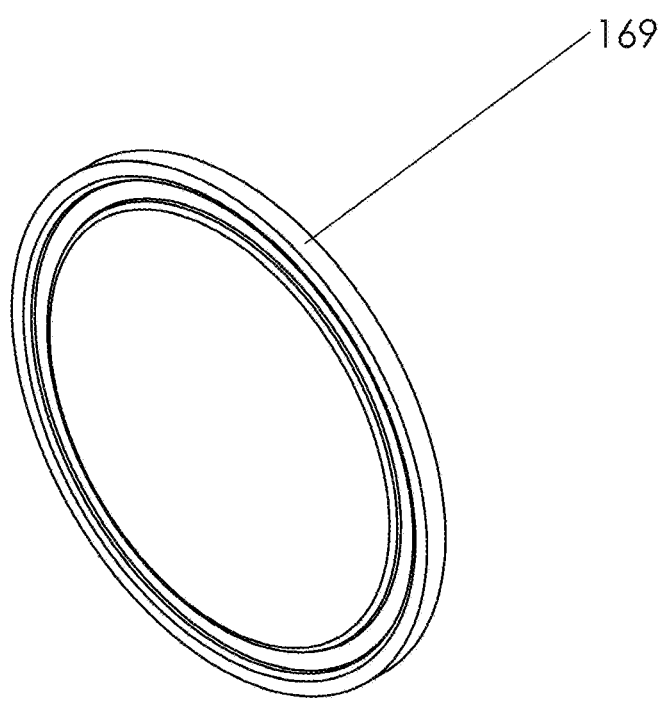
FIG. 5A is a perspective view of an end cap of the present invention.
Figure 5B:
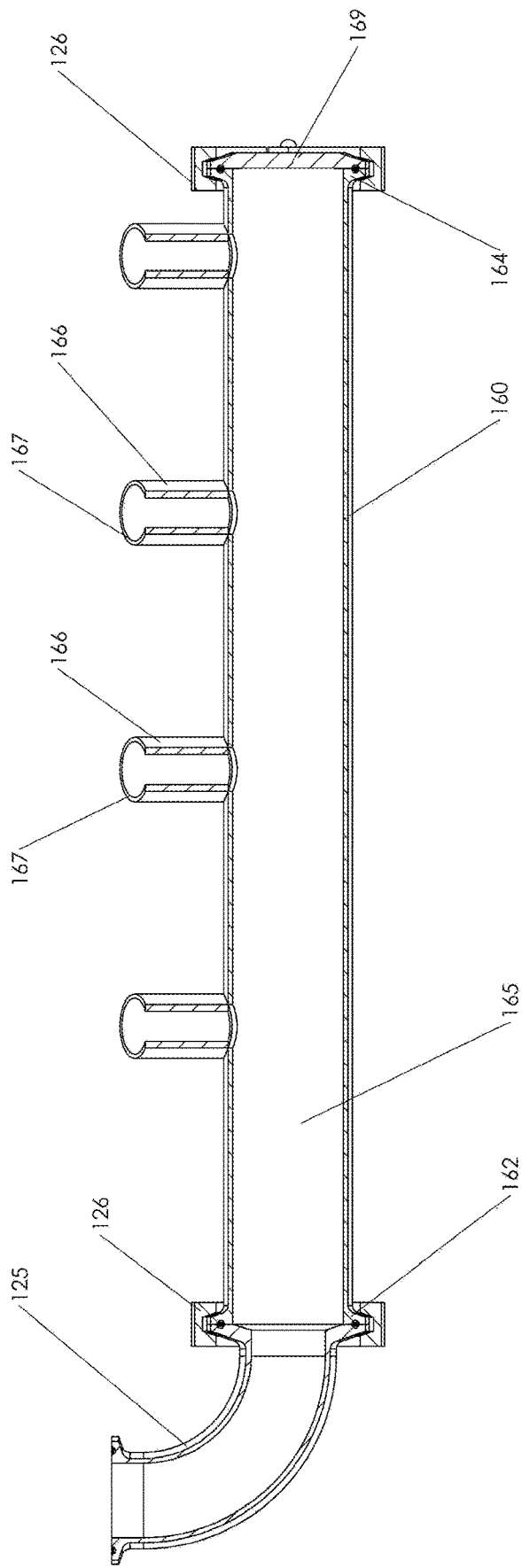
FIG. 5B is a partial sectional view of a discharge manifold of the present invention, a distal end of the discharge manifold being sealed by the end cap of FIG. 5A.

Referring to FIGS. 5A and 5B, the discharge manifold 160 includes opposed proximal 162 and distal 164 ends and a main body 163 extending therebetween. A plurality of discharge jets 166 extend from the main body 163, each discharge jet 166 defining a passageway 167 between an interior area 165 of the discharge manifold 160 and an interior area 115 of the wash tank 110. In some embodiments, the proximal end 162 of the discharge manifold is in fluid communication with the pump outlet 154 of the pump 150 such that fluid enters the interior area 165 of the discharge manifold 160 through an opening in the distal end 164 of the discharge manifold 160 prior to exiting the discharge manifold 160 through the passageways 167 of the discharge jets 166. In some embodiments, an end cap 169 is coupled to the distal end 164 of the discharge manifold 160 so as to prevent fluid from flowing out of the distal end 164 of the discharge manifold 160. In other embodiments, the end cap 169 is removable from the discharge manifold 160 so as to facilitate cleaning the interior area 165 of the discharge manifold 160. In some such embodiments, the end cap 169 is selectively secured to the distal end 164 of the discharge manifold 160 with a pipe clamp 126.

Figure 6B:
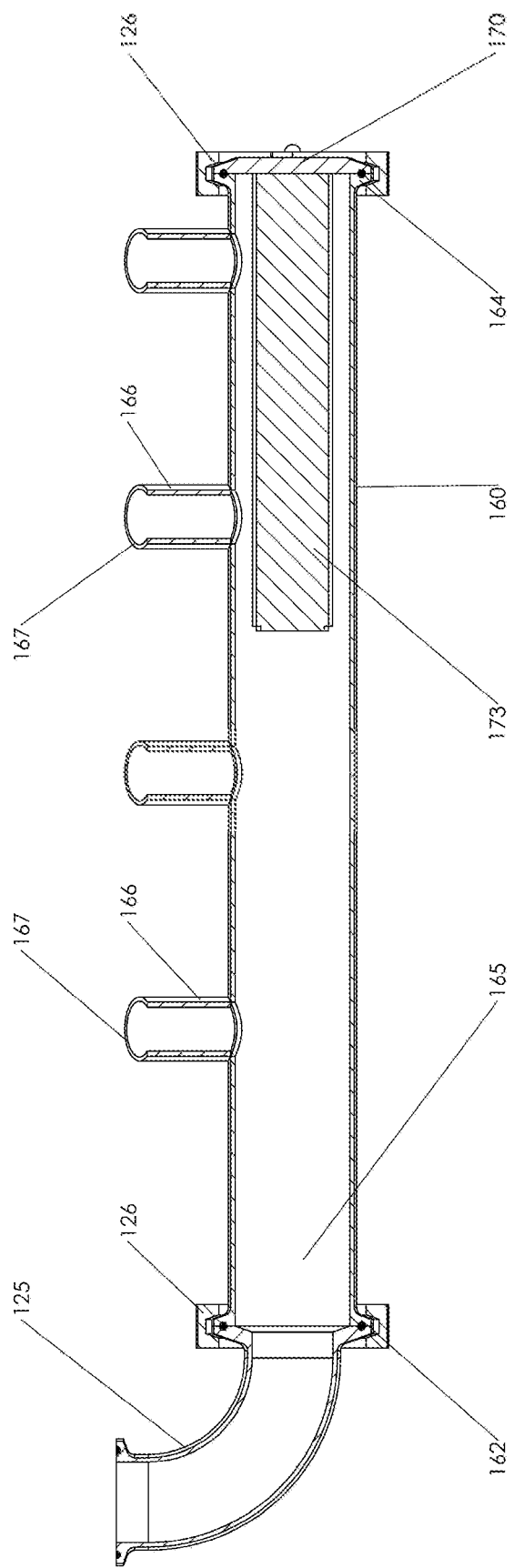
FIG. 6B is a partial sectional view of a discharge manifold of the present invention, a distal end of the discharge manifold being sealed by a proximal end of the flow balancer of FIG. 6A, a main body of the flow balancer extending into an interior area of the discharge manifold.

Referring to FIGS. 6A and 6B, a flow balancer 170 of the present invention includes opposed proximal 172 and distal 174 ends and a main body 173 extending therebetween. In some embodiments, the proximal end 172 of the flow balancer 170 is coupled to the distal end 164 of the discharge manifold 160 so as to prevent fluid from flowing out of the distal end 164 of the discharge manifold 160. In some such embodiments, the main body 173 of the flow balancer 170 extends into the interior area 165 of the discharge manifold 160 such that at least one discharge jet 166 is positioned between the proximal 172 and distal 174 ends of the the flow balancer 170. In this way, fluid flow to such discharge jet 166 is inhibited, reducing the amount of fluid flow out of such discharge jet 166 while increasing the amount of fluid flowing out of one or more other discharge jet.

In some embodiments, the flow balancer 170 is removable from the discharge manifold 160 so as to facilitate cleaning the interior area 165 of the discharge manifold 160. In some such embodiments, the proximal end 172 of the flow balancer 170 is selectively secured to the distal end 164 of the discharge manifold 160 with a pipe clamp 126. In other embodiments, the flow balancer 170 is removable so as to facilitate replacing the flow balancer 170 with an end cap 169 and/or a different flow balancer 170 having different dimensions. In this way, the amount of fluid flow from one or more discharge jet can be adjusted.

The flow balancer 170 separates the interior area 165 of the discharge manifold 160 into first and second portions. The first portion extends from the proximal end 162 of the discharge manifold 160 to the distal end 174 of the flow balancer 170. The second portion extends from the first portion of the discharge manifold 160 to the distal end 164 of the discharge manifold 160. In some such embodiments, the first portion of the interior area 165 is defined by a first cross sectional area and the second portion of the interior area 165 is defined by a second cross sectional area, the second cross sectional area being smaller than the first cross sectional area. In some such embodiments, the difference between the first and second cross sectional areas is equal to a cross sectional area of the flow balancer 170.

In some embodiments, the flow balancer 170 has a generally constant cross section. In some such embodiments, the flow balancer 170 is a cylinder and the cross section of the flow balancer 170 is defined by an exterior diameter of the cylinder regardless of whether the cylinder is hollow. In some such hollow embodiments, fluid is prevented from flowing into an interior area of the flow balancer 170. In this way, the cross section of the discharge manifold 160 is defined by a cross section for which fluid is allowed to flow. In other embodiments, a proximal end 172 of the flow balancer 170 defines a first cross section and the distal end 174 of the flow balancer 170 defines a second cross section. In some such embodiments, the first cross section is larger than the second cross section such that the flow balancer 170 is defined by a varying cross section. In some embodiments, a flow balancer 170 having a varying cross section is configured to extend past at least two discharge jets 166 so as to decrease flow to each of such discharge jets 166. In some such embodiments, the effect associated with the flow balancer 170 is greater one of the discharge jets 166 than for another of the discharge jets 166 at least in part due to the varying cross section. In some such embodiments, the varying cross section is configured such that an amount of fluid flowing out of a first discharge jet positioned along the main body 173 of the flow balancer 170 is approximately equivalent to an amount of fluid flowing out of a second discharge jet 166 positioned along the main body 173 of the flow balancer 170. In other such embodiments, an amount of fluid flowing out of a discharge jet 166 positioned along the main body 173 of the flow balancer 170 is approximately equivalent to an amount of fluid flowing out of a discharge jet 166 that is displaced from the flow balancer 170.

In some embodiments, the proximal end 172 of the flow balancer 170 is sealed to the distal end 164 of the discharge manifold 160, such as with a gasket. In other embodiments, the proximal end 172 of the flow balancer 170 includes a flange that is configured to interface with the distal end 164 of the discharge manifold 160 so as to prevent the flow balancer 170 from being inserted too far into the discharge manifold 160.

Figure 7B:
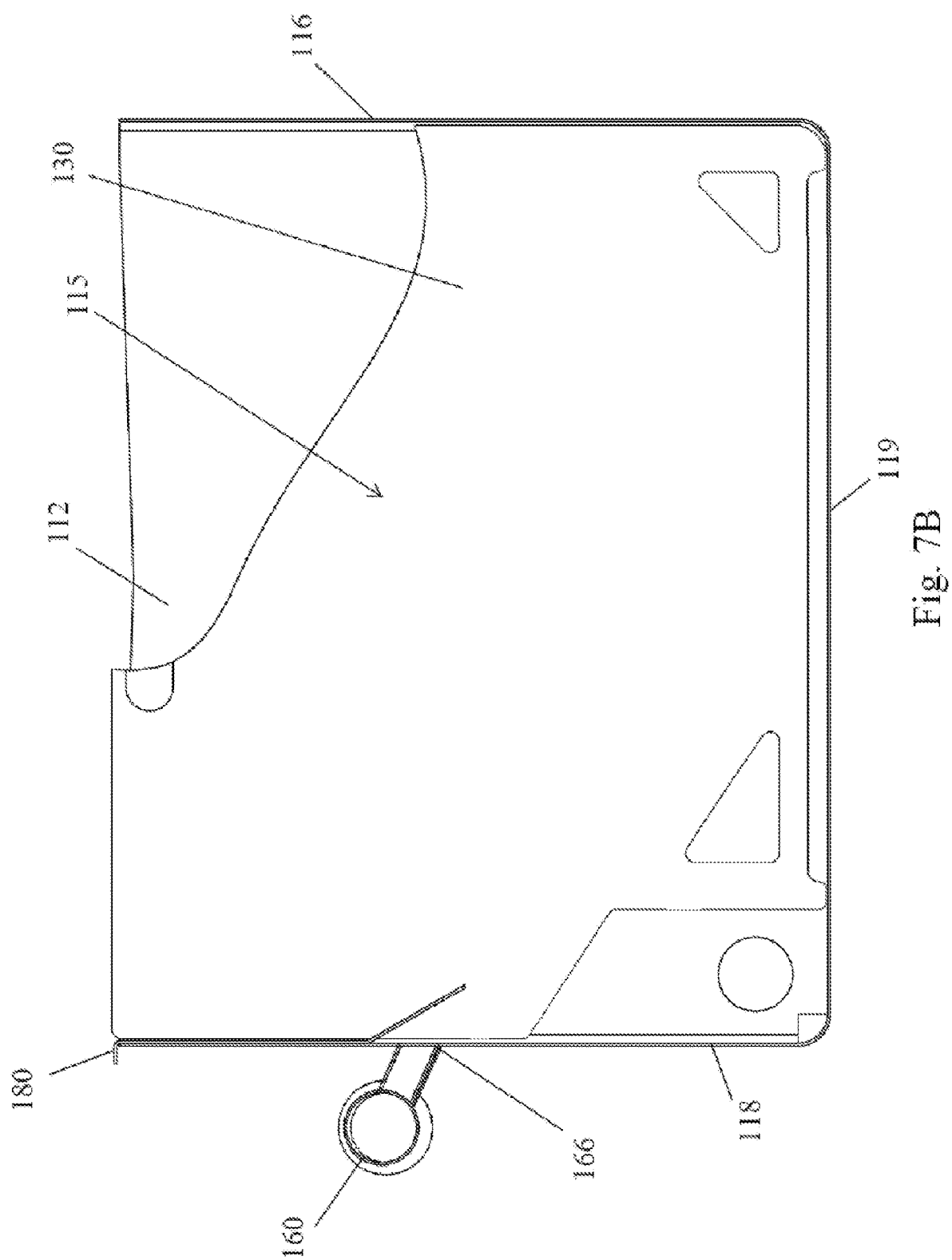
FIG. 7B is a partial sectional view of a horizontal discharge manifold and wash tank of the present invention, FIG. 7B showing a top portion of the diffuser plate of FIG. 7A secured to a top of a wall of the wash tank, a vertical portion of the wash tank extending into an interior area of the wash tank, and an angled portion of the diffuser plate extending over a discharge jet of the discharge manifold.

Referring to FIGS. 7A and 7B, a diffuser plate 180 of the present invention includes an intermediate portion 184 extending between a top portion 182 and a bottom portion 186. In some embodiments the diffuser plate 180 is moveable between a first position and a second position. In the first position, the diffuser plate 180 is displaced from one or more discharge jet 166 such that a discharge stream flowing out of the one or more discharge jet 166 is not affected by the diffuser plate 180. In the second position, at least a portion of the diffuser plate 180 is positioned proximate to at least one discharge jet 166 such that a discharge stream flowing out of the at least one discharge jet 166 is affected by the diffuser plate 180.

In some embodiments, the diffuser plate 180 causes the discharge stream to widen. In some such embodiments, widening the discharge stream increases the cross-sectional area of the discharge stream and/or otherwise decreases the velocity of the circulating fluid flow, thereby decreasing impact forces associated with items circulating within the circulating fluid flow. In other such embodiments, widening the discharge stream increases the consistency of the circulating fluid flow along a width of the wash tank. In other embodiments, the diffuser plate 180 affects the height of the discharge stream and/or diverts the path of the discharge stream.

In some embodiments, the top portion 182 of the diffuser plate 180 is configured to selectively secure to a top of a wall of the wash tank 110, such as the front wall 118 of the wash tank 110 as shown in FIG. 7B. In some such embodiments, the intermediate portion 184 is configured to extend vertically along the wall of the wash tank 110 towards discharge jets 166 extending through the wall of the wash tank 110. In some such embodiments, the bottom portion 186 is configured to extend at an angle downward from a bottom edge of the intermediate portion 184 and outward away from the wall of the wash tank 110. In some embodiments, the angle of the bottom portion 186 of the diffuser plate 180 is approximately equivalent to an angle of the discharge jets 166. In other embodiments, the angle of the bottom portion 186 of the diffuser plate 180 is steeper than the angle of the discharge jets 166 such that a jet stream from such discharge jets is redirected slightly downward upon striking the bottom portion 186 of the diffuser plate 180. In still other embodiments, the angle of the bottom portion 186 of the diffuser plate 180 is less steep than the angle of the discharge jets 166 such that a jet stream from such discharge jets is redirected slightly "upward" upon striking the bottom portion 186 of the diffuser plate 180.

In some embodiments, the wash tank 110 is divided into one or more section, such as with one or more partitioning wall 130. In some such embodiments, a flow balancer 170 is used to equalize the flow of fluid in each section of the wash tank 110 by increasing the amount of fluid flow in one section while decreasing the amount of fluid flow in another section. In other such embodiments, a diffuser plate 180 is secured over at least one discharge jet 166 in at least one tank section.

In some embodiments, the diffuser plate 180 extends into two or more sections of a wash tank 110. In some such embodiments, the diffuser plate 180 defines a slot 188 that is configured to receive a portion of a partitioning wall 130 so that the diffuser plate 180 can extend from one section of the wash tank 110 to another. In some such embodiments, the slot 188 extends from a bottom edge of the bottom portion towards a bottom portion of the intermediate portion. In other such embodiments, the slot 188 extends into the intermediate portion.

The present invention further includes a method of deglazing and/or defrosting one or more chilled item that is at least partially coated with ice and/or at least partially frozen. Such method includes placing an item within a wash tank 110 of a continuous motion washing machine 100; creating a recirculating fluid flow path within the wash tank 110; and allowing the item to be brought into recirculating motion within the fluid flow path. The recirculating motion of the fluid removes any ice from the item. In some embodiments, the temperature of the water is monitored and adjusted as necessary so as to maintain the temperature of the fluid within a working temperature range. In some such embodiments, the upper limit of the working temperature range is a sub-room temperature. In other such embodiments, the lower limit of the working temperature range is slightly above a freezing temperature of the fluid and/or of water (the fluid potentially being water). In this way, the fluid is capable of maintaining the item at a relatively low temperature during the deglazing/defrosting process.

In some embodiments, the system includes a temperature sensor 120 for sensing the temperature of the fluid. In some such embodiments, the temperature sensor 120 measures the temperature of the fluid at or adjacent to the pump 150 so that any heat energy introduced into the fluid by the pump 150 is accounted for in the measured temperature value. In other such embodiments, the system includes one or more heater controller 122 for controlling a heat introduction device (such as a heating element) for introducing additional heat energy into the fluid. In this way, heat energy lost to the item, to the environment, and/or to ice or fluid associated with the item and/or the deglazing/defrosting process, can be replenished. In still other embodiments, heat is intentionally removed from the fluid and/or the average temperature of the fluid is reduced by introducing one or more additional item and/or additional fluid or ice. In this way, the temperature of the fluid can be maintained within the working temperature range during the deglazing/defrosting process.

In some embodiments, the creation of the circulating fluid flow path includes directing a flow of fluid from a pump 150 into a wash tank 110 through one or more discharge jet 166 of a discharge manifold 160. In some embodiments, fluid directed from at least one of the discharge jets 166 is directed onto a diffuser plate 180. In this way, a jet stream exiting the discharge jet 166 is transformed, such as by widening and/or flattening the jet stream. In other embodiments, a plurality of jet streams are directed onto the diffuser plate 180. In some such embodiments, at least one flattened and/or widened jet stream extends to an adjacent flattened and/or widened jet stream. In some such embodiments, the adjacent jet streams for a single jet stream.

In some embodiments, the method further includes inhibiting flow to at least one discharge jet 166. In some such embodiments, a flow balancer 170 is inserted into the fluid flow path between the pump 150 and at least one of the discharge jets 166. In this way, the cross-sectional area through which fluid can travel to such discharge jet 166 is reduced. In other such embodiments, inhibiting flow to such discharge jet 166 creates an increase in flow to one or more other discharge jet 166.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween. therebetween.

What is claimed is:

1. A method of removing ice from items within a continuous motion washing machine, the method comprising:
   placing an item within a wash tank of the continuous motion washing machine;
   creating a recirculating fluid flow path within the wash tank by directing at least one jet of fluid onto a diffuser plate;
   allowing the item to be brought into recirculating motion within the fluid flow path; and
   removing the item from the wash tank,
   wherein the item is a chilled food item at least partially coated with ice prior to being placed in the wash tank, and
   wherein the recirculating motion removes the ice from the chilled food item while the temperature of the chilled food item is maintained at a sub-room temperature level, and, and
   wherein the diffuser plate includes a top portion and a bottom portion, said top portion configured to selectively secure to a top of a first side wall of said wash tank and said bottom portion configured to extend outward from said first side wall when said top portion is secured to said top of said first side wall.

2. The method of claim 1, further comprising adjusting the vertical position of the diffuser plate relative to the at least one jet of fluid, thereby adjusting the width of the flow of fluid.

3. The method of claim 1, wherein the creation of the recirculating fluid flow path includes directing a plurality of fluid jets onto a diffuser plate, and wherein the diffuser plate is configured relative to the plurality of fluid jets to flatten thereby flattening a jet stream associated with each of the fluid jets.

4. The method of claim 3, wherein at least one flattened jet stream extends to an adjacent flattened jet stream so as to create a single flattened jet stream from at least two fluid jets.

5. The method of claim 4, further comprising inserting a flow balancer into a manifold of the washing machine so as to reduce the volume of fluid flowing through the manifold to one of the adjacent discharge jets, thereby increasing the amount of fluid flowing out of one of the jets and decreasing the amount of fluid flowing out of the other jet so that the amount of fluid flowing out of each of the jets is generally equivalent.

6. The method of claim 3, wherein a first jet directs fluid into a first section of the wash tank and a second jet directs fluid into a second section of the wash tank, the first and second sections being separated by a divider such that a first item that is placed in the first section during the placing step remains in the first section until it is removed from the first section during the removing step.

7. The method of claim 6, further comprising inserting a flow balancer into a manifold of the washing machine so as to reduce the volume of fluid flowing through the manifold to the second jet, thereby increasing the amount of fluid flowing out of the first jet.

8. The method of claim 1, wherein a first jet directs fluid into a first section of the wash tank and a second jet directs fluid into a second section of the wash tank, the first and second sections being separated by a divider such that a first item that is placed in the first section during the placing step remains in the first section until it is removed from the first section during the removing step.

9. The method of claim 8, further comprising inserting a flow balancer into a manifold of the washing machine so as to reduce the volume of fluid flowing through the manifold to the second jet, thereby increasing the amount of fluid flowing out of the first jet.

10. The method of claim 1, further comprising: moving said diffuser plate from a first position to a second position, wherein in the first position said diffuser plate is displaced from said jet of fluid such that the jet of fluid is not affected by the diffuser plate, and wherein said second position wherein the diffuser plate is configured relative to at least one jet of fluid to create a flow of fluid having a width that is greater than a width of the jet of fluid.

* * * * *

UNITED STATES PATENT AND TRADEMARK OFFICE
CERTIFICATE OF CORRECTION

PATENT NO. : 12,357,013 B2　　　　　　　　　　　　　　　　　　　　　　　　Page 1 of 1
APPLICATION NO. : 15/334778
DATED : July 15, 2025
INVENTOR(S) : Moore et al.

It is certified that error appears in the above-identified patent and that said Letters Patent is hereby corrected as shown below:

In the Specification

In Column 6, Line 63, delete "is front" and insert -- is a front --, therefor.

In Column 8, Line 65, delete "the the" and insert -- the --, therefor.

In Column 12, Line 18, delete "with in" and insert -- within --, therefor.

In Column 12, Line 35, delete "therebetween. therebetween." and insert -- therebetween. --, therefor.

In the Claims

In Column 12, Claim 1, Line 54, delete "and, and" and insert -- and --, therefor.

Signed and Sealed this
Eighteenth Day of November, 2025

John A. Squires
*Director of the United States Patent and Trademark Office*